INVENTOR.
EDWARD C. FOX
BY
Eugene M. Whitacre
Attorney

INVENTOR.
EDWARD C. FOX
BY
Eugene M. Whitacre
Attorney

INVENTOR.
EDWARD C. FOX
BY
Eugene M. Whitacre
Attorney

INVENTOR.
EDWARD C. FOX
BY
Eugene M. Whitacre
Attorney

United States Patent Office 3,444,396

Patented May 13, 1969

3,444,396

SIGNAL TRANSLATING CIRCUIT PROVIDING SIGNAL-CONTROLLED TIME DELAY

Edward C. Fox, Trenton, N.J., assignor to Radio Corporation of America, a corporation of Delaware Filed Mar. 24, 1965, Ser. No. 442,370
Int. Cl. H03k *17/28*
U.S. Cl. 307—293 10 Claims

ABSTRACT OF THE DISCLOSURE

An electronic time delay modulator includes a multi-tap delay line and circuitry for scanning the taps of the delay line in accordance with a complex control signal. The scanning is carried out by electronic analog commutator means which fades rather than switches from one tap of the delay line to the next. The analog commutator comprises electronic circuitry which is controlled by a complex electrical control signal to effect scanning of the taps of the delay line in a manner that a signal applied to the delay line is smoothly moulated in relative delay as a function of the complex electrical control signal.

This invention relates to electrical signal translating circuits and in particular to electrical circuits for modulating a complex electrical signal by controlling its relative time delay by another complex electrical signal.

There are a number of problems in communications and information storage and retrival which require an electrically controlled time delay. These include the correction of timing errors in video and data tape recording systems, and the simulation and correction of tracing and tracking angle errors in stereo disk recording systems.

Electrically controlled delay can be achieved by varying the delay time of an entire lumped element line by means of voltage variable capacitors. This technique suffers from several limitations. For example, the ratio of delay variation to mean delay is limited by the amount that the characteristic impedance of the line can be varied from the fixed termination impedance. Also, the high frequency cut-off of this type of device to its control signal is inversely proportional to the mean delay time. Two other types of electrically controlled delay are the bucket-brigade delay line, as described by J. M. Janssen, "Discontinuous Low Frequency Delay Line With Continuously Variable Delay," Nature Magazine, vol. 169 p. 148 (January 26, 1952) and the crossed-field, charged particle delay line as described by H. G. Slottow, "Crossed Field Charged Particle Delay Lines," University of Illinois, Coordinated Science Laboratory, Report R214. In the bucketbrigade line samples of an applied signal are transferred from capacitor to capacitor at a frequency which determines the delay per stage. In the cross-field charged particle delay line, the applied signal modulates the strength of an electronic beam which then passes through a region of crossed electrical and magnetic fields before reaching a collector. The strengths of the electrical and magnetic fields determine the delay. While these two devices do not suffer the same limitation on the ratio of delay variation to mean delay as does the variable capacitor lumped element line, they do have the same limitation on the bandwidth of the control signal. It is this limitation which precludes the use of any of these devices for simulation and correction of vertical tracking angle errors in stereo disk recording systems as well as other applications which require delay modulators having a large bandwidth.

It is an object of this invention to provide an electronically controlled commutator having a finite number of output terminals wherein output signals are smoothly faded from ont output terminal to the next in accordance with the polarity and amplitude of a complex control signal applied to the commutator.

It is another object of the present invention to provide improved electronic circuitry for controlling the output from a tapped delay line.

It is another object of the present invention to provide an electrically controlled tapped delay line system capable of a delay variation nearly equal to the mean delay and which can accept control signal frequencies much higher than the reciprocal of the mean delay.

It is a still further object of the present invention to provide an improved means of electronically modulating the time delay of one complex signal by another complex signal.

An electronic time delay modulator embodying the invention includes a multi-tap delay line and circuitry for scanning the taps of the delay line in accordance with a complex control signal. The scanning is carried out by novel electronic analog commutator means which fades rather than switches from one tap of the delay line to the next. The analog commutator comprises electronic circuitry which is controlled by a complex electrical control signal to effect scanning of the taps of the delay line in a manner that a signal applied to the delay line is smoothly modulated in relative delay as a function of the complex electrical control signal.

The novel features which are considered to be characteristic of this invention are set forth with particularity in the appended claims. The invention itself, however, both as to its organization and method of operation, together with further objects an dadvantages thereof, will be better understood from the following description considered in conjunction with the accompanying drawing in which:

Figure 1:
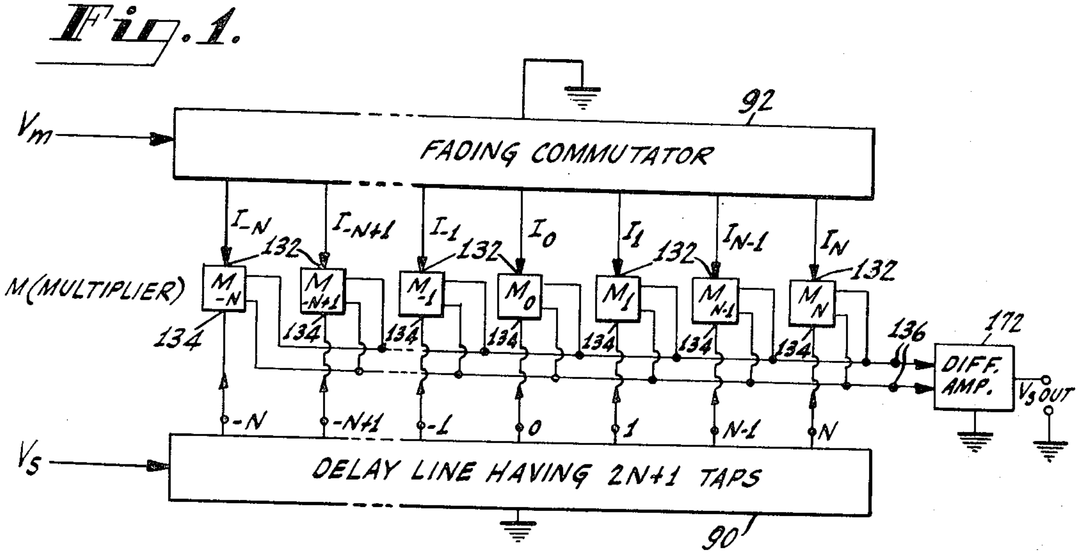
FIGURE 1 is a block diagram of a 2N+1 tap delay modular embodying the invention.

A block diagram of a time delay modulator is shown in FIGURE 1. For convenience in the description, the delay line output taps and the circuits associated with them are numbered with subscripts —N through N with N=0 representing the center tap.

Referring now to FIGURE 1, a signal voltage $V_s$, to be delay modulated is applied to the input terminal of the delay line 90 having 2N+1 output taps and an equal delay time between taps. As indicated above N equals the number of taps between the center tap and either end of the line. Fading commutation between the taps of the delay line to effect delay modulation is accomplished by a fading commutator 92. The fading commutator 92 is controlled by a delay modulating voltage $V_m$ to control the relative transmission of the delayed signal voltages appearing at the respective delay line taps. The fading commutator 92 has a plurality of output terminals which are individually coupled to one input terminal 132 of different multiplier circuits $M_{-N}$ to $M_N$; with a second input terminal 134 for each of the multipliers coupled respectively to the delay line as shown.

Figure 2:
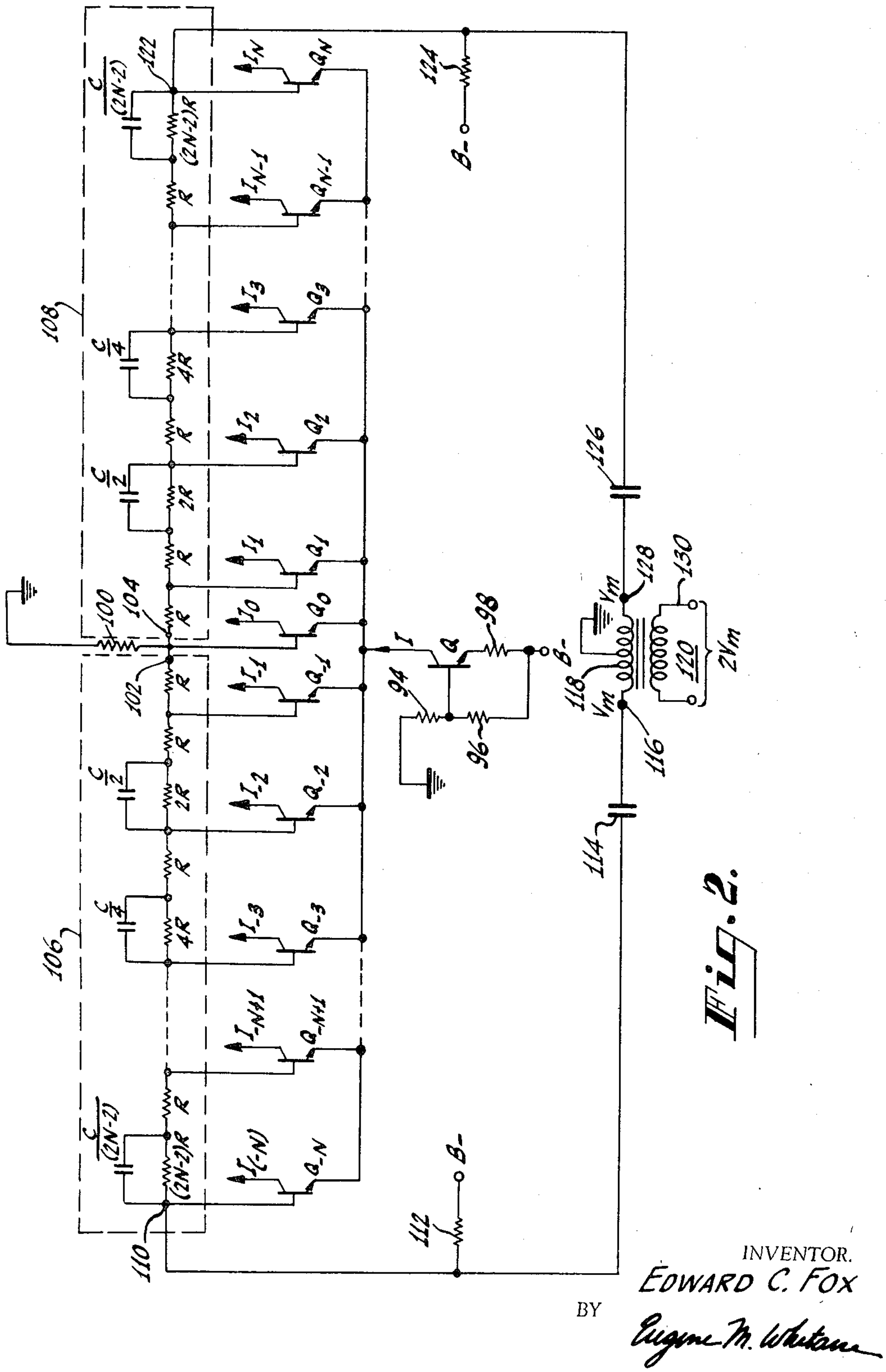
FIGURE 2 is a schematic circuit diagram of the fading commutator portion of the delay modulator of FIGURE 1.

Referring now to FIGURE 2 a fading commutator circuit is shown for deriving the commutation currents $I_{-N}$ to $I_N$. The circuit includes a plurality of transistors corresponding in number to the number of delay line taps and designated generally as $Q_0$, $Q_1$ to $Q_N$, $Q_{-1}$ to $Q_{-N}$. The emitter electrodes of transistor $Q_{-N}$ through $Q_N$ are connected together and to the collector electrode of a transistor Q. The transistor Q is biased by means of resistor 94, 96 and 98 connected between the negative terminal of a direct current power supply (B—) and ground or reference potential so as to produce a constant current I from its collector electrode. The current I is then divided between the emitter electrodes of transistors $Q_{-N}$ through $Q_N$.

The distribution of the current I among the emitter electrodes of the transistors $Q_{-N}$ through $Q_N$ is controlled by the particular voltage appearing between the respective base and emitter electrodes of the transistors $Q_{-N}$ through $Q_N$ as will be hereinafter described. Thus the sum of the emitter electrode currents of transistors $Q_{-N}$ through $Q_N$ are equal to the collector current I of transistor Q, and the collector currents $I_{-N}$ through $I_N$ of the respective transistors $Q_{-N}$ through $Q_N$ are equal to the emitter currents of said transistor as modified by the $\alpha$'s of the transistors. For typical transistors, $\alpha$ varies from about 0.96 to almost unity. Thus, the output collector currents $I_{-N}$ through $I_N$ are approximately equal to their respective emitter currents and the sum of the output currents ordinarily will not vary more than $\pm 2\%$ around a constant value during commutation.

The base electrode of transistor $Q_0$ is connected through a resistor 100 to ground or reference potential. The base electrode of transistor $Q_0$ is also connected to corresponding end terminals 102 and 104 of a pair of symmetrical networks 106 and 108. Each network separately consists of the serial connection of resistors R, R, 2R, R, 4R . . . R and (2N–2)R, where as before N equals the number of delay line output taps between the center tap and either end of the line 90 (FIGURE 1), and the magnitude of resistor 2R is twice that of resistor R, and resistor 4R is four times that of R etc. By-pass capacitors C/2, C/4 . . . C/(2N–2) are connected in parallel across respective multiple resistors 2R, 4R . . . (2N–2)R. The values of the capacitors are chosen to provide a low impedance A-C path across the multiple resistors 2R, 4R . . . (2N–2)R for the lowest expected frequency of modulating voltage $V_m$. The other end terminal 110 of network 106 is connected through resistor 112 to a source of negative potential B—. Terminal 110 is also connected through a D.C. blocking capacitor 114 to one end terminal 116 of a center tapped to ground secondary 118 of a transformer 120. Similarly the other end terminal 122 of network 108 is connected through a resistor 124 to B— and also through a coupling capacitor 126 to the other end terminal 128 of secondary 118. Resistors 112 and 124 provide protection for the transformer 120.

As heretofore mentioned, the base electrode of transistor $Q_0$ is connected to end terminals 102 and 104 of networks 106 and 108 respectively. The base electrodes of transistors $Q_{-1}$ through $Q_{-N}$ (with the exception of $Q_0$) are respectively connected to succeeding serial connections of resistors R and R, R and 2R etc. of network 106. The base electrodes of transistors $Q_1$ through $Q_N$ are similarly connected to respective serial connections of R and R, R and 2R etc. in network 108 as shown in FIGURE 2.

In operation, the D.C. voltage B— is applied in parallel across networks 106 and 108. Since the networks are symmetrical, the current supplied by the D-C voltage B— will divide symmetrically across the two networks. Thus the D.-C. voltage drop across corresponding resistors R, 2R, 4R etc. of both networks 106 and 108 will be equal.

When an A-C modulating signal voltage (represented here for convenience as $2V_m$) is applied across the primary winding 130 of the one to one transformer 120, at any instant of time the voltage $V_m$ developed between terminal 116 and the center tap of the secondary winding 118 is equal and opposite in phase to the voltage $V_m$ developed between terminal 128 and the center tap of the winding 118.

Since the multiple resistors 2R, 4R . . . (2N–2)R of networks 106 and 108 are each bypassed by respective shunting capacitors C/2, C/4 . . . C/2N–2), the A-C modulating voltages $\pm V_m$ will divide symmetrically across each of the resistors R of networks 106 and 108 respectively. Resistor 100 prevents the maximum base voltage of any of the transistors from exceeding their collector voltage. (The multiplier circuits connected to the collector electrodes provide a return path to ground as will be explained). As the D-C voltage drop across the resistor 100 is small, it will be neglected for purposes of this description.

Figure 3:
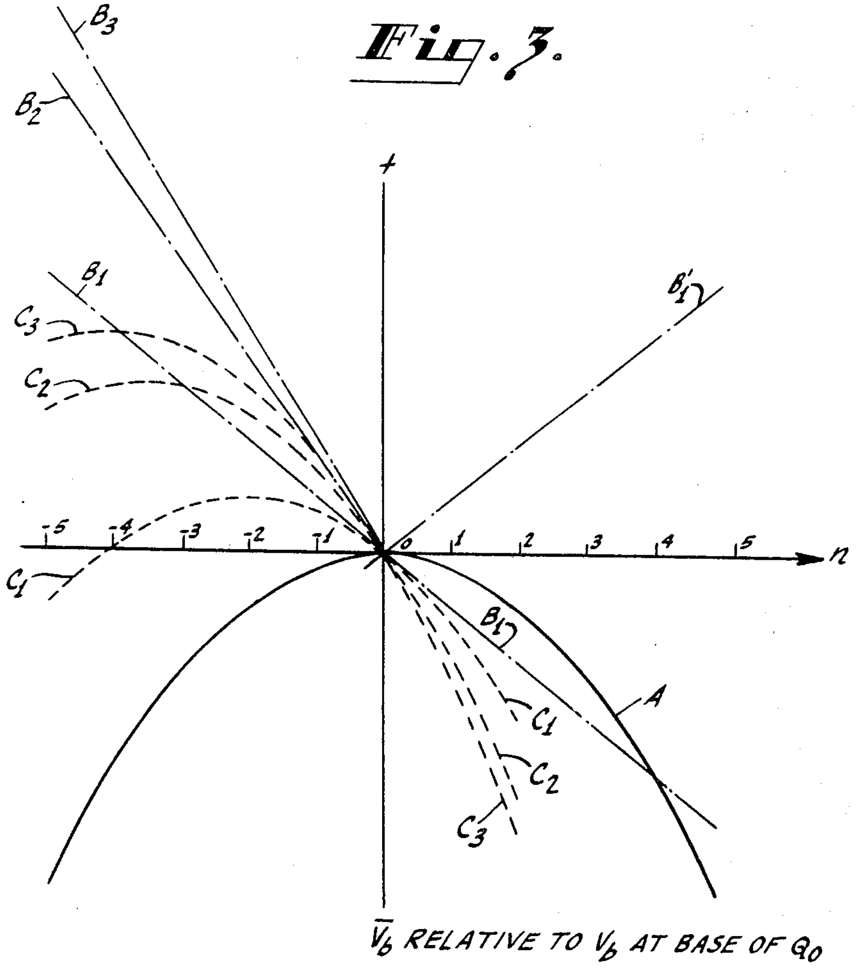
FIGURE 3 is a graph including curves showing the relative D-C, A-C, and combined D-C and A-C voltages between the base and emitter electrodes of the transistors $Q_{-N}$ through $Q_N$ shown in FIGURE 2.

With reference to the graph of FIGURE 3 the solid curve A represents the base voltage of the various transistors $Q_{-N}$ to $Q_N$ relative to the voltage at the base electrode of the transistor $Q_0$. From this curve it will be noted that the base electrodes of the transistor proceeding in either direction away from the transistor $Q_0$ become increasingly more negative. As a result, in the absence of an input control signal $V_m$, the transistor $Q_0$ has a greater forward bias than the other transistors, and hence carries a proportionally greater share of the constant current I supplied to the network by the transistor Q.

The dot-dash curves $B_1$, $B_2$ and $B_3$ represent different amplitudes of modulating signal voltage $V_m$ applied between the end terminals 110 and 122 of the series connected resistive divider networks 106 and 108. For the curves $B_1$–$B_3$ the terminal 110 is instantaneously positive relative to the terminal 122. It will be noted that the curves $B_1$–$B_3$ are linear as compared to the curve A because the resistors 2R, 4R etc. are bypassed by the capacitors C/2, C/4 etc. for the A-C signal $V_m$. The curves $B_1$–$B_3$ show that when the terminal 110 is positive relative to the terminal 122, the base electrodes of the transistors $Q_{-N}$–$Q_{-1}$ are driven more positively (i.e. forward bias direction) whereas the base electrodes of transistors $K_1$–$Q_N$ are driven more negatively (i.e. further in the reverse direction).

The composite A-C and D-C voltages appearing at the base electrodes of the respective transistors is shown by the dotted curves $C_1$, $C_2$ and $C_3$. With the indicated D-C biasing voltage distribution and with an A-C modulating signal $V_m$ having an amplitude as indicated by the curve $B_1$, the instantaneous voltage distribution at the base electrodes of the various transistors is such that the transistor $Q_{-2}$ has the greatest forward bias and hence carries more of the constant current I than the other transistors. When the input signal $V_m$ increases in magnitude to a value as represented by the curve $B_3$, the voltage distribution at the base electrodes of the transistors is as indicated by the curve $C_3$ which shows that the fourth transistor to the left of the transistor $Q_0$ (FIGURE 2) has the greatest forward bias. It will be understood that as the modulating signal $V_m$ changes in polarity, as for example indicated by the curve $B_1'$, the voltage distribution curves will reverse so that the transistors having the greatest forward bias will be represented to the right of the ordinate of FIGURE 3 or to the right of the transistor $Q_0$ as shown in FIGURE 2.

Under certain conditions of modulating signal voltage amplitude as represented by the curve $B_2$, the result of voltage distribution at the base electrodes of the representative transistors is as indicated by the curve $C_2$. This curve shows that the forward bias of the third and fourth transistors to the left of the transistor $Q_0$ have the same bias voltage and are more forward biased than any of the other transistors, Accordingly these two transistors will conduct like amounts of the constant current I but of a greater magnitude than the currents carried by the other transistors.

Figure 4:
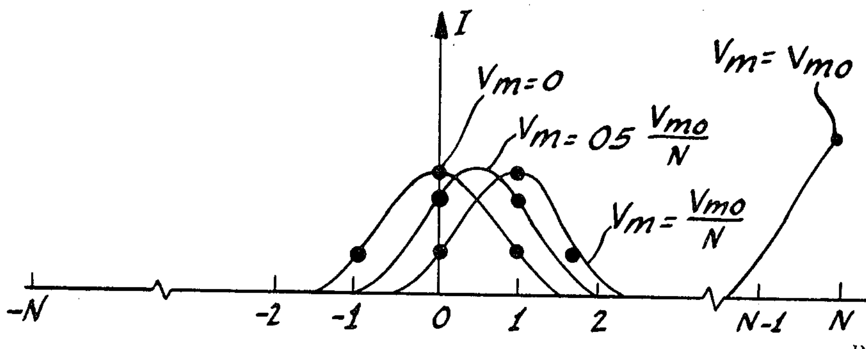
FIGURE 4 is a graph of the commutator collector currents of transistors $Q_{-N}$ through $Q_N$ as a function of the amplitude of the modulating signal voltage $V_m$.

The sum of all the currents from the transistors of the fading commutator is very nearly constant and the amplitude of the output current from any one of the transistors is dependent on the modulating voltage $V_m$, and is very nearly a Gaussian or "bell-shaped" curve of the type shown in FIGURE 4. The transistor or transistors which conduct the maximum current are determined by the amplitude and polarity of the applied modulating signal $V_m$. Thus it will be seen that the current from any one of the transistors $Q_{-N}$ to $Q_N$ rises smoothly from a minimum value of nearly zero current to a maximum value which is less than the total current I in a smooth, or fading manner.

As an expedient to a further understanding of the invention, the preceding descriptive operation of the fading commutator circuit will now be explained mathematically.

Referring again to FIGURE 2, the networks 106 and 108 provide a D-C voltage distribution for the transistor bases in accordance with the equation $$V_{b(n)dc}=V_{b(0)}-K_1m^2 \qquad (1)$$

where $V_{b(0)}$ is the base to emitter voltage of transistor $Q_0$, $K_1$ is a constant including the negative supply voltage B— and the values of the resistors in the networks 106 and 108, and $n$ is a whole number representing a particular transistor position in a range between, and inclusive of, N and —N.

It is to be understood that the D-C voltage distribution for the transistor bases is not to be limited by the square law relationship shown in Eq. 1 and as specifically provided by the networks 106 and 108. In a broad sense, it will be apparant that the effective D-C voltage distribution necessary to effect fading commutation in accordance with the invention will be obtained if the D-C voltage distribution on the transistor bases follows an even power function.

The A-C voltage distribution for the transistor bases is provided by the same networks of resistors together with the bypass capacitors C/2, C/4, etc., and the one to one transformer 120. The A-C voltage distribution is given by the equation $$V_{b(n)_{ac}}=Vm\frac{n}{N} \qquad (2)$$

Therefore, the total instantaneous distribution of $V_{b(n)}$ is then $$V_{b(n)}=V_{b(n)_{dc}}+V_{b(n)_{ac}}=V_{b(o)}-K_1n^2+V_m \qquad (3)$$

It is to be further understood that suitable "balanced resistive ladder networks" could be used in place of the networks 106 and 108 shown in FIGURE 2 to effect the desired A-C and D-C biasing voltage distribution for the bases of the transistors $Q_{-N}$ to $Q_N$.

To a very good approximation, provided the transistor emitter current $I_e$ is much larger than the transistor emitter saturation curent $I_s$, then the emitter current of a transistor follows the law:

$$I_e=I_s\exp\left\{\frac{qV_{be}}{K_2T}\right\} \qquad (4)$$

where $xp$ indicates that the quantity enclosed by brackets is the exponent of $e$, and $e$ is equal to 2.718; $q$ is electronic charge; T is absolute temperature; and $K_2$ is Boltzmann,'s constant. At room temperature and assuming that all of the transistors $Q_{-N}$ through $Q_N$ in the commutator circuit have the same emitter saturation current $I_s$, then $$I_{en}=I_s\exp\left\{-40\left(V_{b(o)}-K_1n^2+\frac{nV_m}{N}-V_e\right)\right\} \qquad (5)$$

where $V_{b(0)}$ is the base to emitter voltage of the center transistor $Q_0$, and $V_e$ is the voltage common to all the emitters as indicated in FIGURE 2.

Since $$\sum_{-N}^{N}I_{en}=I=\text{a constant} \qquad (6)$$

it follows that $$\frac{I_{en}}{I}=\frac{\exp\left\{-40\left(\frac{nV_m}{N}-K_1n^2\right)\right\}}{\sum_{-N}^{N}\exp\left\{-40\left(\frac{nV_m}{N}-K_1n^2\right)\right\}} \qquad (7)$$

Referring to Equation 7 the maximum value of the argument of the exponential in the numerator occurs when $$\frac{dn}{d}\left(\frac{nV}{m}-K_1n^2\right)=0 \qquad (8)$$

which gives $$Vm-2K_1n=0 \text{ or } n\frac{Vm}{2K_1N} \qquad (9)$$

If Equation 7 is normalized by dividing numerator and denominator by the value of the numerator when $$n=\frac{Vm}{2K_1N}$$

then $$I_{en}=I\frac{\exp\left\{\frac{-10}{K_1N^2}(Vm-2K_1Nn)^2\right\}}{\sum_{-N}^{N}\exp\left\{\frac{-10}{K_1N^2}(Vm-2K_1Nn)^2\right\}} \qquad (10)$$

Provided that values of the exponential for $n=\pm N$ are both small compared to the other elements in the sum in the denominator, the denominator is a constant. Thus $I_{en}$ and therefore $I_n$ will be a "Gaussian" distribution which translates linearly along the $n$ axis with $V_m$, and where the maximum available current from the collector of each transistor in the commutator circuit is faded smoothly from one collector to the next as the modulating signal voltage $V_m$ is varied. This is indicated graphically in FIGURE 4 for various values of $V_m$.

Referring back to FIGURE 1, the fading commutator currents $I_n$ corresponding to the collector currents $I_{-N}$ through $I_N$ of transistors $Q_{-N}$ through $Q_N$ are individually applied to respective control input circuits 132 of a series of multiplier or gate circuits $M_{-N}$ through $M_N$. The signal voltages $V_s$ appearing at each of the taps of the delay line 90 are applied to a second input terminal 134 of the respective multiplier circuits associated with each delay line tap. The output terminals of each of the multiplier circuits are connected to a pair of common output terminals 136 and then to a difference amplifier 172 to provide an output for the delay modulator as will be hereinafter described. Thus the fading commutator currents $I_{-N}$ through $I_N$ gate or control the proportionate delay and amplitude of the signal voltage $V_s$ passed through each of the multiplier circuits M and summed at the modulation output terminal 136.

The multiplier circuits M may be of various design and are well known in the art.

Figure 5:
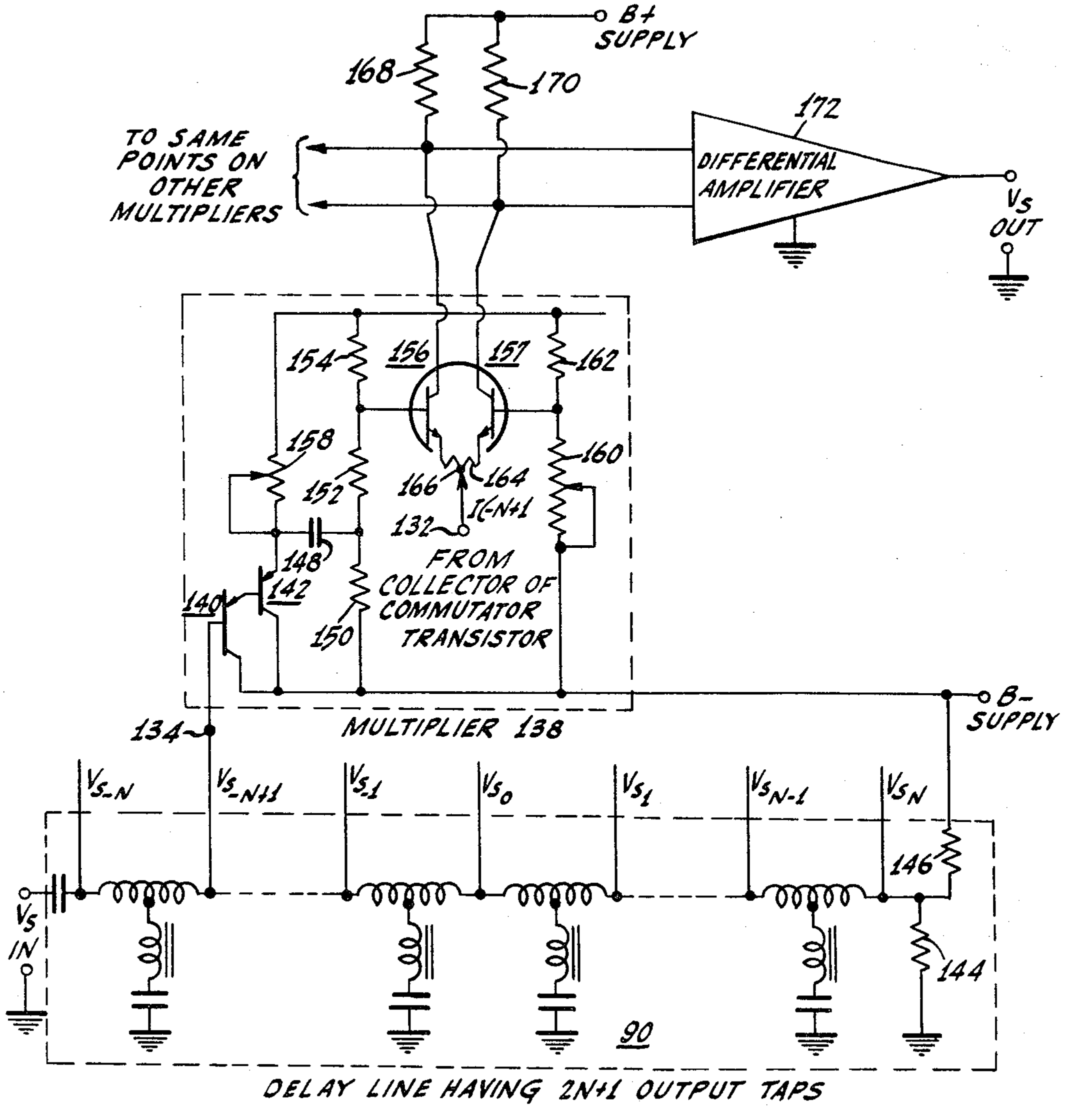
FIGURE 5 is a schematic circuit diagram of one of the multipliers of FIGURE 1 and its connection with the delay line and the output circuitry.

FIGURE 5 shows the circuit of one of such multipliers and its connection with the delay line and the output summing circuitry. The delay line is of the $m$-derived, T section type with $m$ preferably equal to 1.27. Such a line has good phase linearity and amplitude uniformity.

The signal voltage $V_{s(n)}$ at each tap of the delay line 90 is introduced into the multiplier M 138 through the transistors 140 and 142 in order to insure negligible loading at the delay line taps. The voltage dividing resistors 144 and 146 provide the base bias for the emitter followers 140 and 142 via the delay line 90 and also serve to load the delay line 90 with its characteristic impedance.

The signal voltage developed at the emitter electrode of transistor 142 is coupled through a capacitor 148 to a network of voltage dividing resistors 150, 152 and 154. The network steps the signal down in voltage and impedance to a suitable level for driving the transistor 156 and also provides bias for the transistor 156. A potentiometer 158 connected in the emitter electrode circuit of transistor 142 varies the A-C gain of the multiplier 138 and is adjusted to compensate for gain variations in the multipliers associated with each delay line tap, said variations being caused principally by variations in $\alpha$ among the multiplier and commutator transistors.

A potentiometer 164 is connected between the emitter electrodes of the transistor 156 and 157. The potentiometer wiper terminal 166 is connected to the collector electrode of one of the commutator transistors $Q_{-N}$ to $Q_N$ (FIGURE 2).

An adjustable voltage dividing network of resistors 160 and 162 provide a bias for the transistor 157. This bias is adjusted relative to that of transistor 156 to obtain zero difference between the collector currents of the transistors 156 and 157 for zero signal conditions at the delay line tap.

The potentiometer 164 is adjusted by means of the wiper 166 to balance the ohmic components of the emitter impedances of the transistors 156 and 157 so that the collector current from the appropriate commutator transistor which is applied to the potentiometer wiper terminal 166 will divide equally between the left and right emitters of dual transistors 156 and 157 over the entire range of emitter input currents when there is no signal applied to the delay line 90, thus assuring that the modulating signal $V_m$ itself can cause no output as will be hereinafter explained.

The gain of each of the transistor 156 and 157 circuits is linearly proportional to the total current $I_n$ available to the emitter electrodes of the transistor 156 through potentiometer 164. Thus, multiplication of the delay line tap signal $V_{s(n)}$ by the commutator output current $I_n$ is achieved.

The collector electrodes of the transistors 156 and 157 are connected to respective load resistors 168 and 170, which are also common to the corresponding transistor collector electrodes associated with all the other multiplier circuits $M_{-N}$ to $M_N$. The voltage drops developed across these resistors 168 and 170 by all the currents from the collector electrodes of the transistors associated with each of the multiplier circuits M are amplified and combined in a differential amplifier 172 in a manner known in the art to provide a output signal voltage $V_s$ proportional to the instantaneous difference between the voltage drops developed across resistors 168 and 170. Note that under zero input signal $V_s$ conditions, the collector currents of the dual transistors are equal and the difference between the voltage drops developed across resistors 168 and 170 is zero, thereby providing a zero output voltage from the differential amplifier 172.

Thus, the instantaneous output voltage of the delay modulator is effectively proportional to the sum of the products of the delay line tap voltages $V_{s(n)}$ and the commutator currents $I_{(n)}$, with the individual commutator currents $I_{-N}$ through $I_N$ each being a function of the amplitude of the modulating signal voltage $V_m$ at any given instant of time.

In the circuit of the present invention, the frequency of the delay variation, i.e. the frequency of the applied signal voltage $V_s$ is not limited by the inverse of the mean delay time of the delay line 90 as was the case in circuits of the prior art. Furthermore, by proper choice of design parameters, a delay variation approximately equal to the mean delay time of the delay line 90 is obtainable.

The principles of the present invention are applicable to a system for the simulation and correction of vertical tracking angle errors in stereo disk recording.

When 15° became the standard for the vertical tracking angle in the stereo disk recording, many cutters and many more pickups had vertical tracking angles quite different from this. Pickups ranged from nearly 0° to about 50°. Cutters ranged from −15° to +10°. The wide scatter in pickup angles has been much reduced since that time. However, many cutters are still in use which have negative tracking angles and for which it is difficult, if not impossible to achieve a 15° angle by tilting the cutter. Thus, electronic compensation is desirable.

The instantaneous time delay variation caused by the vertical tracking angle in a stereodisk cutter is equal to the product of the tangent of the cutter vertical tracking angle and the vertical displacement of the cutting stylus divided by the linear record groove speed. If the vertical tracking angles in record and playback are equal, no variation in the instantaneous time delay occurs.

Figure 6:
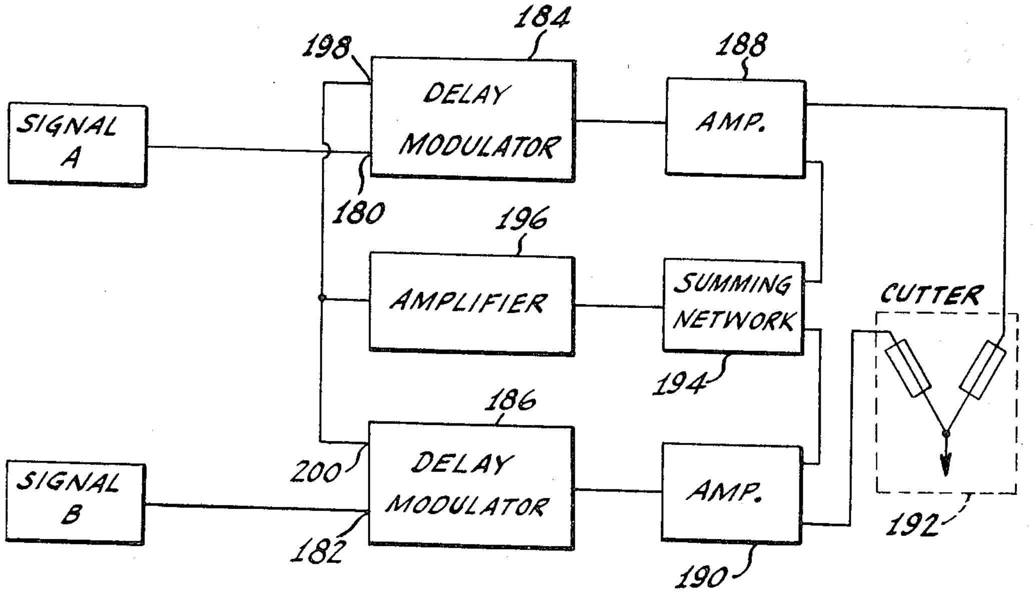
FIGURE 6 is a block diagram of a recording system embodying a delay modulator in accordance with the present invention.

Accordingly, a block diagram of a system for recording stereodisks with a desired vertical tracking angle and which utilizes a pair of delay modulators in accordance with the present invention is shown in FIGURE 6.

It is to be understood that the embodiment described in FIGURE 6, is in no way intended to limit the application and use of the present invention to other embodiments.

The recording system shown in FIGURE 6 is for recording 45–45 stereophonic records. Such a recording system provides a record having groove walls at right angles and each at 45° to the record surface. Each of the groove walls is recorded with one of the stereophonically related signals. A source of stereophonic signals A and B which may comprise spaced microphones or prerecorded stereophonic signals on a magnetic tape are coupled respectively to the signal input terminals 180 and 182 of delay modulators 184 and 186. The output signals from the delay modulators 184 and 186 are connected through amplifiers 188 and 190 to drive separate coils of a 45–45 cutter head 192. The apparatus used in the recording system may be of any known type, and may include additional amplifiers or other signal translating circuits, with the signals A and B passed through the delay modulators 184 and 186 respectively. The output signals A and B that drive the coils of the cutter 192 are in the form of instantaneous voltages proportional to cutting stylus displacement.

The A and B output signals from the amplifiers 188 and 190 are also coupled to a summing network 194 which provides an output voltage proportional to the vertical component of stylus displacement only. The output of the summing network 194 is coupled to an amplifier 196 that has a gain proportional to the difference between the tangent of the desired vertical tracking angle and the tangent of the fixed vertical tracking angle of the cutter 192. The output of the amplifier 196 is the modulating signal $V_m$ which represents a voltage whose instantaneous amplitude is proportional to the delay needed during recording to provide a desired vertical tracking angle. The modulating signal $V_m$ is then coupled to the respective modulating signal input terminals 198 and 200 of the delay modulators 184 and 186 to delay modulate the applied A and B input signals as heretofore described.

What is claimed is:

1. An electrical signal translating circuit comprising in combination:

a plurality of current controlling devices each having a control electrode, a common electrode and an output electrode;

means providing a direct current connection between said common electrodes;

a plurality of utilization means coupled respectively to said output electrodes;

a constant current source connected to said common electrodes;

means providing a source of direct current operating potential;

biasing means comprising first and second direct current networks connected in parallel across said source of operating potential;

means connecting the control electrode of one of said devices to a point common to said first and second networks;

means connecting the control electrodes of the other of said devices symmetrically along said first and second networks so that the voltages at the control electrodes of pairs of symmetrically connected devices on said first and second networks proceeding away from the connection of said one device follows an even power law distribution, with said one device being biased to conduct more current than the other devices and with succeeding devices connected along said first and second networks proceeding away from said common point being biased to conduct progressively less current;

means providing a source of alternating current signals; and means coupling said source of alternating current signals to ends of said first and second network remote from said common point so that said first and second networks are effectively connected in series with respect to said source of alternating current signals and the alternating current voltage difference between the control electrodes of succeeding devices along said first and second voltage dividers is substantially equal and linearly related to said alternating current signals.

2. An electrical signal translating circuit comprising in combination:

a plurality of current controlling devices each having a control electrode, a common electrode, and an output electrode;

means providing a direct current connection between said common electrodes;

a plurality of utilization means coupled respectively to said output electrodes;

a constant current source connected to said common electrodes;

means providing a source of direct current operating potential;

biasing means comprising first and second voltage divider networks connected in parallel across said source of operating potential;

means connecting the control electrode of one of said devices to a point common to said first and second voltage dividers;

means connecting the control electrodes of the other of said devices symmetrically along said first and second voltage dividers so that the voltages at the control electrodes of pairs of symmetrically connected devices on said first and second voltage dividers proceeding away from the connection of said one device follows an even power law distribution, with said one device being biased to conduct more current than the other devices and with succeeding devices connected along said first and second voltage dividers proceeding away from said common point being biased to conduct progressively less current;

means providing a source of alternating current signals;

means for coupling said source of alternating current signals to ends of said first and second voltage dividers remote from said common point so that said first and second voltage dividers are effectively connected in series with respect to said source of alternating current signals; and reactive circuit means connected to bypass symmetrical portions of said first and second voltage divider networks so that the voltage difference between the control electrodes of succeeding devices along said first and second voltage dividers is substantially equal and linearly related to said alternating current signals.

3. An electrical signal translating circuit comprising in combination:

a plurality of at least three current controlling devices each having a control electrode, a common electrode and an output electrode;

means providing a direct current connection between said common electrodes;

a plurality of utilization means coupled respectively to said output electrodes;

means providing a source of direct current operating potential;

constant current means connecting said common electrodes to said source of direct current;

means providing a source of alternating current signals;

biasing means having a plurality of output terminals corresponding in number to the number of said devices, and having input terminals for connection to said alternating current and direct current sources, said biasing means having a characteristic such that the relationship of the direct current voltages appearing at said plurality of output terminals follows an even power function, and the alternating current voltage difference between said plurality of terminals is linearly related; and means connecting said plurality of output terminals to the control electrodes of said current controlling devices.

4. An electrical signal translating circuit comprising in combination:

a plurality of transistors each having a base electrode, an emitter electrode and a collector electrode;

means providing a direct current connection between said emitter electrodes;

a plurality of utilization means coupled respectively to said collector electrodes;

means providing a source of direct current operating potential;

a pair of symmetrically arranged voltage divider networks connected in parallel across said source of direct current operating potential;

means connecting the base electrode of one of said transistors to a point common to said pair of voltage divider networks to provide a forward bias to said one transistor;

said networks each including a plurality of series connected resistors forming a plurality of tap points at spaced junctions thereof from said common point;

means connecting the base electrodes of the other of said transistors symmetrically to said tap points along said pair of voltage divider networks;

said series connected resistors having values chosen to provide an even power law distribution of said direct current operating potential at said tap points and provide progressively less forward bias to symmetrically arranged pairs of said other transistors than said one transistor in a direction proceeding away from said common point;

means providing a source of alternating current signals;

means coupling said source of alternating current signals to ends of said first and second voltage divider networks remote from said common point so that said first and second voltage divider networks are effectively connected in series with respect to said source of alternating current signals; and reactive circuit means connected to bypass symmetrical portions of said first and second voltage divider networks so that the alternating current voltage difference between the base electrodes of succeeding transistors along said first and second voltage dividers is substantially equal and linearly related to said alternating current signals.

5. An electrical signal translating circuit comprising in combination:
a plurality of transistors each including base, emitter, and collector electrodes;
means providing a direct current connection between said emitter electrodes;
a plurality of utilization means coupled respectively to said collector electrodes;
a constant current source connected to said emitter electrodes;
biasing means connected to provide a direct current forward bias between the base and emitter electrodes of one of said transistors and progressively less forward bias between the base and emitter electrodes of symmetrically arranged pairs of said other transistors;
means providing a source of alternating current signals; and
dividing means for linearly distributing said alternating current signals between succeeding base and emitter electrodes of said transistors.

6. A delay modulator comprising:
a delay line having an input terminal and a plurality of output terminal taps corresponding to different periods of delay;
means providing a signal source connected to said delay line input terminal;
circuitry for commutating along the taps of said delay line in accordance with a modulating signal;
said circuitry including:
a plurality of current sources, the number of said current sources corresponding to the number of taps on said delay line and the peak amplitude of the current supplied from each of said current sources corresponding to a different instantaneous amplitude of said modulating signal; and
multiplying means connected to each of said taps and said current sources for operating on the signal appearing at each of said delay line output taps to provide a composite output signal having an instantaneous delay varying as a function of said modulating signal.

7. A delay modulator comprising:
means providing a source of signals to be delay modulated;
a delay line coupled to receive signals from said source and having a plurality of taps corresponding to different periods of delay;
a plurality of current controlling devices each having a control electrode, a common electrode, and an output electrode;
a constant current source connected to said common electrodes;
an output circuit;
a plurality of multiplier circuits each having first and second input terminals and an output terminal and characterized by an output signal proportional to the product of the signals applied to said input terminals;
means respectively connecting each of said output electrodes to different ones of said multiplier first input terminals;
means respectively connecting each of said delay line taps to different ones of said multiplier second input terminals;
means connecting said multiplier output terminals in common to said output circuit;
means providing a source of direct current operating potential;
biasing means comprising first and second direct current voltage dividers connected in parallel across said source of operating potential;
means connecting the control electrode of one of said devices to a point common to said first and second voltage dividers;
means connecting the control electrodes of the other of said devices symmetrically along said first and second voltage dividers so that the voltages at the control electrodes of pairs of symmetrically connected devices on said first and second voltage dividers proceeding away from the connection of said one device follows an even power law distribution, with said one device being biased to conduct more current than the other devices and with succeeding devices connected along said first and second voltage divider proceeding away from said common point being biased to conduct progressively less current;
means providing a source of alternating current signals;
means for coupling said source of alternating current signals to ends of said first and second voltage dividers remote from said common point so that said first and second voltage dividers are effectively connected in series with respect to said source of alternating current signals; and
reactive circuit means connected to bypass symmetrical portions of said first and second voltage dividers so that the alternating current voltage difference between the control electrodes of succeeding devices along said first and second voltage dividers is substantially equal and linearly related to said alternating current signals.

8. A delay modulator comprising:
means providing a source of signals to be delay modulated;
a delay line coupled to receive signals from said source and having a plurality of taps corresponding to different periods of delay;
a plurality of current controlling devices each having a control electrode, a common electrode, and an output electrode;
a constant current source connected to said common electrodes;
signal summation means;
a plurality of multiplier circuits each having first and second input circuits and an output circuit and characterized by an output signal proportional to the product of the signals applied to said input circuits;
means respectively coupling each of said output electrodes to different ones of said multiplier first input circuits;
means respectively coupling each of said delay line taps to different ones of said multiplier second input circuits;
means coupling said multiplier output circuits in common to said signal summation means;
means providing a source of direct current operating potential;
means providing a source of alternating current signals;
biasing means having a plurality of output terminals corresponding in number to the number of said devices, and having input terminals for connection to said alternating current and direct current sources, said biasing means having a characteristic such that the relationship of the direct current voltages appearing at said plurality of output terminals follows an even power function and the alternating current voltage difference between said plurality of terminals is substantially linear; and
means connecting said plurality of output terminals to the control electrodes of said current controlling devices.

9. A delay modulator comprising:
a delay line having an input terminal and a plurality of output terminal taps corresponding to different periods of delay;
means providing a signal source connected to said delay line input terminal;
means providing a source of modulating signals;
a plurality of current sources, the number of said current sources corresponding to the number of taps on said delay line and the peak amplitude of the current supplied from said current sources being a function of the instantaneous amplitude and polarity of said modulating signals; and gate circuit means connected to respective taps of said delay line and respective current sources for supplying an output signal delayed as a function of said modulating signal.

10. A delay modulation comprising:

a delay line having an input terminal and a plurality of output terminal taps corresponding to different periods of delay;

means providing a signal source connected to said delay line input terminal;

a plurality of transistors each including base, emitter and collector electrodes;

means providing a direct current connection between said emitter electrodes;

a constant current source connected to said emitter electrodes;

biasing means connected to provide a forward bias between the base and emitter electrodes of one of said transistors and progressively less forward bias between the base and emitter electrodes of symmetrically arranged pairs of said other transistors;

means providing a source of alternating current signals;

dividing means for linearly distributing said alternating current signals between succeeding base and emitter electrodes of said transistors;

a plurality of multiplier means each having two input circuits and an output circuit and characterized by an output signal proportional to the product of the signals applied to said input circuits, one of said input circuits being respectively coupled to the different taps of said delay line, and the other of said input circuits being respectively coupled to the collector electrodes of different ones of said transistors to be acutated by the current supplied therefrom; and signal summation means coupling the output circuit of each of said multiplier means in common whereby the outputs of different taps of the delay line are selectively added to produce an output signal having an instantaneous time delay determined by the instantaneous amplitude of said alternating current signal.

References Cited

UNITED STATES PATENTS 3,290,520 12/1966 Wennik ---------- 330—69 XR

ARTHUR GAUSS, *Primary Examiner.*

JOHN ZAZWORSKY, *Assistant Examiner.*

U.S. Cl. X.R.

307—244, 262, 270; 328—55, 106, 155; 333—18, 29